Nov. 29, 1960    L. K. HOOPER    2,961,868
LEAK MEASURING APPARATUS
Filed March 6, 1957
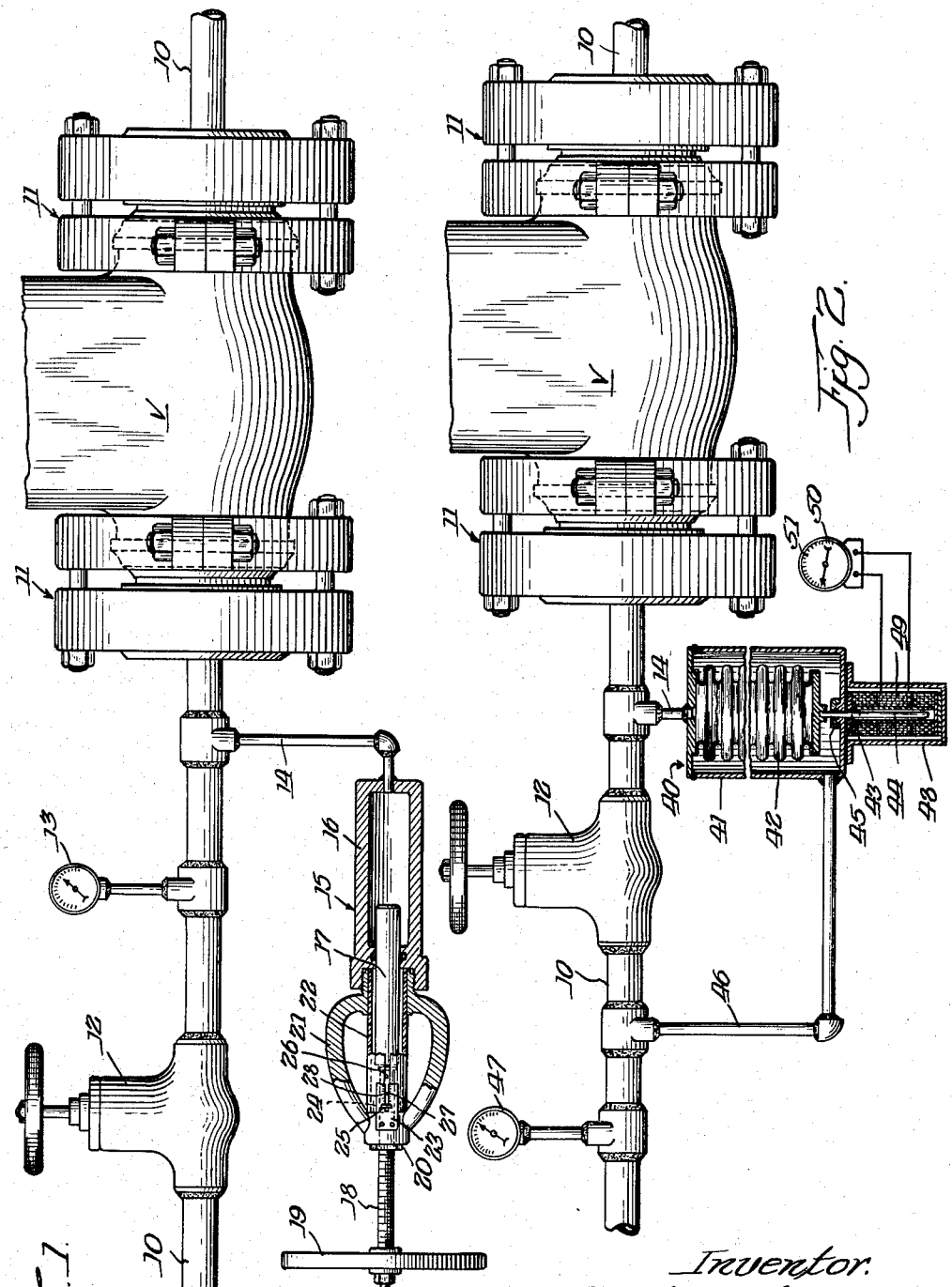
Inventor.
Louis K. Hooper.
By Joseph O. Lang
Atty.

United States Patent Office 2,961,868
Patented Nov. 29, 1960

2,961,868

LEAK MEASURING APPARATUS

Louis K. Hooper, La Grange Park, Ill., assignor to Crane Co., Chicago, Ill., a corporation of Illinois Filed Mar. 6, 1957, Ser. No. 644,326

14 Claims. (Cl. 73—40)

The present invention relates generally to apparatus for measuring leakage of fluid in pressure testing of valves, pressure vessels, and like closed bodies, and is more particularly directed to such apparatus incorporated in a trapped fluid pressure system including a body under test.

In general, the invention provides means subjected to fluid under predetermined pressure trapped in a closed fluid system including a closed body under test, and movable to reduce the effective volume of the system in compensation for fluid leaking from the body, with means for applying fluid pressure to the movable means in opposition to the trapped fluid pressure so as to effect the compensating movement thereof, and with means to indicate the volume reduction, which of course equals the leakage. With accurate leakage measurement over a given time interval, the leakage rate is easily determined. One illustrated embodiment of the inventive concept employs a piston or plunger movable in a cylinder open at one end to the interior of the body. As leakage from the body occurs, the plunger is moved in the cylinder to reduce its effective volume, by means of a threaded stem operated by a handwheel or the like. Indicating means calibrated in any desired volumetric units show the change in volume effected by movement of the plunger. Movement of the plunger, either substantially continuously or at intervals, may be accomplished in response to gauge indication of a decrease in the trapped fluid pressure resulting from leakage. Another embodiment employs a bellows, the interior of which is open to the trapped fluid pressure and the exterior of which is subjected to constant pressure of the value of the desired test pressure, so that as leakage occurs the bellows is automatically compressed to reduce the effective volume of the system and the test pressure is maintained at the desired value. Electromagnetic indicating means are provided responding to movement of the bellows to show the volume reduction. Of course, instead of a bellows, other means subjected to the opposing pressures so as to reduce the effective volume of the system as leakage occurs may be used.

In testing valves and other bodies at considerable pressures and elevated temperatures, measurement of leakage by prior apparatus has been complicated, laborious, and above all inaccurate, because such apparatus was designed to measure the escaping liquid, commonly water, which vaporized upon leaking under certain conditions of temperature and pressure, and in any case was difficult or impossible to collect. Measurement of vaporized fluid required condensation of the escaped fluid and determining the volume of the condensate, sometimes by weighing. The results obtained were only approximate and could not be relied on, especially when only slight leakage occurred. The apparatus of the present invention, by measuring the loss of fluid on the pressure side, eliminates any such difficulty, and at the same time simplifies the maintenance of the desired test pressure, which is necessary for valid test results. As indicated, it is of particular advantage and utility in testing under conditions of vaporization or other complications in collection and measurement of the escaping test fluid, but it is also advantageous in cases which do not involve such complications.

It is an object of the invention to provide apparatus for accurately measuring leakage and leak rate of valves, pressure vessels, and like bodies under pressure test, particularly under conditions rendering measurement of leaking fluid difficult.

Another object is the provision of apparatus for obtaining accurate determination of leakage loss from the pressure side of a trapped fluid pressure system incorporating a valve, vessel, or other closed body to ascertain the leakage from the body.

Another object is the provision of means for accurately measuring fluid leakage from a valve, vessel, or other closed body under pressure test, giving results unaffected by vaporization of the leaking fluid.

A further object of the invention is the provision of means for accurate determination of leakage of valves and other closed bodies by measuring the reduction in effective volume of a trapped pressure fluid system incorporating such a body which results from contracting the volume to compensate for lowering of pressure due to leakage.

Still another object is the provision of apparatus for measuring fluid leakage from a valve or other closed body incorporated in a trapped fluid pressure system by determination of leakage loss from the pressure side of the system while maintaining the pressure in the system.

Other and further objects, advantages, and features of the invention will be apparent to those skilled in the art from the following detailed description and the accompanying drawings, in which:

Fig. 1 is a somewhat diagrammatic elevational view, partly in section, showing one embodiment of the invention employed in testing a valve; and Fig. 2 is a similar view showing another embodiment of the invention.

Referring first to Fig. 1, there is shown a valve V subjected to a seat leakage test. The valve in closed condition is subjected to greater pressure on one side of the seat than on the other to determine the rate of leakage past the seat under the differential pressure condition. The valve V is connected in a test fluid line 10 by means of suitable clamping fixture means generally designated 11 which are appropriately gasketed or otherwise sealed to prevent leakage at the joints. Fluid under the desired pressure from any suitable source (not shown) is supplied through the line 10 to enter the test valve V from the left as viewed in Fig. 1, a shut-off valve 12 being interposed between the source and valve V to control flow of the fluid. The right-hand end of the line 10, under any desired pressure lower than the pressure on the pressure side, communicates with the interior of the valve, the seat and the closure engaged therewith thus serving as a seal between the high and low pressure sides and of course being subjected to the pressure differential between those sides. Any appropriate means may be employed to provide the desired pressure at the low side.

Communicating with the interior of the line 10 between the shut-off valve 12 and the test valve V is a gauge 13 of any suitable type to indicate the pressure acting on the high pressure side of the seat. Also connected to the line 10 between the shut-off valve 12 and the test valve V by a suitable branch connection 14 is a leak measuring device generally designated 15. The device 15 comprises a cylinder 16 open at one end to the branch conduit 14 and having a plunger or piston 17 extending through the other end thereof for movement into and out of the cylinder, an O-ring or other sealing means being provided to prevent leakage thereabout. In the present instance, the piston has a threaded stem 18 rotatable by a suitable handwheel 19 secured on the end thereof. The stem works in a threaded yoke sleeve 20 mounted in one end of a yoke 21, the other end of which is secured to the cylinder 16. A cylindrical protecting sleeve 22, which may be of plastic or other appropriate material, extends between the yoke sleeve 20 and the cylinder to protect the piston 17 against possible damage when withdrawn from the cylinder. Provision is made of means to indicate the position of the piston relative to the cylinder, or more precisely to indicate the changes in the effective volume of the cylinder by the movement of the piston, particularly inward movement. In the present instance, the indicating means is illustrated as comprising a plate 23 extending between the opposite ends of the yoke 21 and secured thereto. A peripherally grooved collar 24 is secured on the threaded stem 18 as by a set screw or other suitable means, and a pointer 25 formed at one end for relatively rotatable engagement in the groove of the collar 24 extends through a slot 26 in the protecting sleeve 22 and a registering slot 27 in the indicating plate 23. The outer end of the pointer may be formed or provided with a suitable portion which cooperates with graduations 28 along the slot 27. The pointer is held in the collar groove against independent movement axially of the stem, so that as the collar moves with the stem upon rotation of the latter to shift the piston 17, the pointer moves correspondingly along the graduations 28 to indicate the position of the piston. It will now become apparent that for each linear unit of movement of the piston inwardly of the cylinder 16, a corresponding reduction in the effective volume of the cylinder will occur. Accordingly, the indicating plate may be calibrated in any desired volumetric units to avoid need for calculation. Of course, other indicating means may be used.

In operation, after the valve V has been properly connected in the fluid supply line 10, the shut-off valve 12 is opened to allow the test fluid to apply pressure on one side of the seat of the valve V. The cylinder 16 is filled with the fluid, either through the branch line 14 or through a suitable filler opening. If the cylinder is filled by fluid flowing from the line 10 through the branch line 14, the cylinder may be vented in any appropriate manner. The gauge 13, of course, indicates the fluid pressure in the valve V acting on one side of the valve seat. When the desired pressure is reached, the shut-off valve 12 is closed to trap the fluid under pressure in the system comprising the cylinder 16, the portion of the line 10 between the valve 12 and the valve V, and a portion of the interior of the valve V, which is closed as described. If leakage occurs through the seat from the high pressure side to the low pressure side, the test pressure of course drops and the fall is indicated by the gauge 13, whereupon the piston 17 is projected into the cylinder 16 by rotation of the handwheel 19 to reduce the effective volume of the system and bring the test pressure to the desired value. The decrease in the effective volume of the system is of course equal to the loss of fluid by leakage past the seat of the valve V and is shown directly by the indicating means, so that it may be read from the position of the pointer along the slot 27 in the plate 23. The amount of leakage during the period of a test, or for any interval during that period, will of course readily yield the leakage rate during such period or interval, since the time during which the leakage occurs is known. Obviously, other means for moving the piston than those shown, either manual or automatic, may be employed.

It will be understood that if the temperature and pressure differential condition on the opposite sides of the test valve seat are such that test fluid leaking through the seat would vaporize as it passed to the low pressure side, and it would be difficult or impossible to determine the volume of leakage, if it were not for the provision of the leak measuring device for determining the volume reduction on the high pressure side. It will also be clear that a similar difficulty would arise if test fluid were present at the low pressure side, even though temperature and pressure conditions were such that vaporization would not occur, since the leaking fluid would mingle with the fluid already present at the low pressure side. The same would of course be true if a gas were used as the test fluid.

The test valve V in this case is a gate valve, but might be of any type. It will be understood that the invention is applicable to the testing of pressure vessels, tanks, and other closed hollow bodies, the valve V being one example of this type of body.

In Fig. 2 there is shown another embodiment of the invention, the valve V being connected in the line 10 by the clamping means 11, with the shut-off valve 12 provided in the line to control the fluid under pressure from the source to the test valve. In communication with the high pressure side of the line 10 between the shut-off valve and the test valve by means of the branch line 14 is a leak measuring device indicated generally at 40. This device comprises a suitable casing 41 within which is supported a bellows 42. The bellows is hermetically sealed from the interior of the casing and at one end is fixed in the casing and open to the branch line 14, so that the interior of the bellows is subjected to the fluid pressure in the test valve V. The other end of the bellows is arranged to be clear of the casing even in fully extended condition, and has an axial stem 43 projecting therefrom with an outer end portion 44 formed of paramagnetic material. A suitable seal 45 prevents leakage from the casing about the stem. A by-pass line 46 connects the casing 41 to the line 10 between the source of pressure fluid and the shut-off valve 12, so that the exterior of the bellows is subjected to the pressure at all times, whether the valve 12 be open or closed. A pressure gauge 47 is provided in the line 10 between the pressure fluid source and the shut-off valve to indicate the fluid pressure, so that the said pressure may be maintained constant at the value predetermined for the particular test. Means of a known type for indicating movement of the stem 43 are provided, comprising a housing 48 supported from the casing 41, in which are disposed a plurality of electromagnetic coils 49 which may be energized from any suitable source, not shown. The coils are mounted with their hollow centers aligned to receive the stem 43 therewithin. Connected to the output side of the coil construction is a milliammeter 50 or other suitable meter measuring a desired output characteristic. As the paramagnetic portion 44 of the stem moves in contraction or expansion of the bellows, a change in the output characteristic occurs which is indicated by the meter 50. Calibrations 51 on the meter give an indication of the variations in the effective volume of the bellows 42 as it expands and contracts. These calibrations may conveniently be provided in volumetric units based upon precalculation of the change in the volume resulting in a given degree of movement of the stem 43, so that the meter gives a direct reading of the bellows volume, or change of volume. Since indicating means of the type illustrated are known, a more detailed description thereof is not considered necessary.

In operation, after the test valve V has been connected in the line 10 by the clamping fixtures 11, the shut-off valve 12 is opened to apply the pressure of the fluid in the high pressure or upstream side of the line 10 to act upon the seat of the test valve, which is in the closed position, and also upon the interior of the bellows 42, the exterior of which is of course subjected to the same pressure through the by-pass line 46. The shut-off valve 12 is then closed to trap the fluid at the predetermined test pressure in a closed system comprising the portion of the line 10 between the closures of the valve 12 and the test valve V and the bellows 42. Fluid is supplied from the source to the high pressure side of the line at a constant pressure equal to the value of the predetermined test pressure to be applied to the test valve V, and acts through the by-pass 46 on the exterior of the bellows 42. The gauge 47 gives an accurate visual indication that this pressure is maintained constant. As leakage occurs to the low pressure side of the line 10 through the seat of the closed test valve, the fluid pressure in the portion of the line between the valve 12 and the valve V and therefore in the bellows 42 would fall correspondingly, but for the fact that the constant predetermined test pressure applied to the exterior of the bellows causes the contraction of the bellows to reduce the effective volume of the bellows and the closed system, so that the fluid pressure on both sides of the shut-off valve 12 is maintained at the same predetermined test value. As the bellows contracts, the paramagnetic portion 44 of the stem 43 moves within the electromagnetic coils 49 thereby to vary the characteristic of the coil output which the meter 50 measures, in this case the current, so that the milliammeter will indicate directly the reduction in volume of the bellows. As in the case of the construction illustrated in Fig. 1, the reduction in volume of the fluid trapped between the shut-off valve and the test valve V corresponds to the leakage through the test valve seat, and the reading of the meter 50 therefore indicates the volume of leakage, from which the leakage rate for any interval or period of time during the test of valve V may readily be determined. It will be obvious that instead of the bellows 42, other means subjected at one side to a constant pressure at the predetermined test value and at the other side to the trapped fluid pressure acting on the closed seat of the test valve V may be employed. For example, a free piston or a diaphragm of suitable design might be employed to accomplish the same purpose. Similarly, it will be understood that instead of the electromagnetic indicating means shown in Fig. 2, other suitable indicators may be employed.

The construction shown in Fig. 2 has the advantage over that of Fig. 1 in that it does not require the presence of an operator after connection of the test valve or other vessel or body in the line, except at such times as readings of the volume reduction are to be taken, and also in that the predetermined test pressure is not allowed to drop at any time during the test. As hereinbefore stated, however, the means for moving the piston 17 in the measuring device of Fig. 1 may be automatic, and may be arranged to respond to slight lowering of the predetermined test pressure for promptly raising the lowered pressure to the desired value.

While the invention is illustrated and described as employed in the testing of valves and other hollow bodies, it will be obvious that it may as readily be applied to the detection and measurement of leakage through substantially flat members, such as plates or membranes, by the provision of suitable means for subjecting such members or desired portions of the areas thereof to the test pressure, and accordingly such members are included in the meaning of the terminology designating the bodies subjected to leakage test and measurement.

It will also be evident that the two embodiments of the invention specifically shown do not exhaust the physical constructions which may be provided for practicing the invention, and accordingly it is not intended that the invention be limited except as required by the spirit and scope of the appended claims.

I claim:

1. Apparatus for leak testing of a closed hollow body comprising a fluid system closed except for a gap therein, means for incorporating a test body in said gap to close said system, means for trapping fluid under pressure in said system including said test body, reciprocally movable plunger means subjected to said trapped fluid pressure movable within a chamber of the system for reducing the effective volume of said system to compensate for fluid leakage from the body and maintain said pressure, means for selectively imparting volume-reducing movement to said movable plunger means, and measuring means cooperating therewith indicating the reduction in volume of the system.

2. In apparatus for static pressure leak testing of closed hollow bodies including means for supplying fluid under pressure to the interior of a test body and means for trapping the pressure fluid in said body, a device for measuring leakage comprising a variable volume chamber in direct communication with said body, plunger means movable axially within the chamber for reducing the effective volume of said chamber to compensate for the volume of fluid leaking from the body and maintain said pressure, and means cooperating with said plunger means indicating the reduction in volume of the chamber.

3. Apparatus for measuring leakage from a closed hollow body under leakage test, comprising means for trapping fluid under predetermined pressure in a test body, a variable volume chamber in communication with said body, movable means projecting within the chamber for reducing the effective volume of said chamber to compensate for the volume of fluid leaking from the body and maintain said pressure, and means cooperating with the movable projecting means indicating the volume reduction of the chamber.

4. Apparatus for measuring leakage from a closed hollow body under leakage test, comprising a fluid system closed by inclusion of said test body therein, means trapping fluid under pressure in said system, the system having a substantially cylindrical chamber closed at an outer end thereof, means subjected to said trapped fluid pressure movable within the chamber for reducing the effective volume of the system and chamber to compensate for leakage from the body and maintain said pressure, means applying pressure to said movable means in opposition to the trapped fluid pressure for effecting volume-reducing movement of the movable means, said latter means being actuated from said outer end of the cylindrical chamber, and means measuring volume reduction of the system.

5. In apparatus for leak testing of a closed hollow body by fluid under pressure trapped in the body, a device for measuring leakage comprising a cylinder in communication with the closed body, a plunger axially movable in said cylinder for reducing the effective volume thereof to compensate for the volume of leakage from the body and maintain said pressure, threaded means including a threaded extension on said plunger outwardly of the cylinder for moving the plunger, and means cooperating with the said threaded extension for indicating the reduction in volume of the cylinder.

6. Apparatus for measuring leakage from closed hollow bodies, comprising means for trapping fluid under pressure in a closed body, a cylinder in direct communication with said body, a plunger axially movable in said cylinder for reducing the effective volume thereof to compensate for the volume of fluid leaking from the body and maintain said pressure, threaded means and a yoke mounting for moving said plunger including a threaded outer portion of the plunger extending beyond the yoke mounting, and means indicating the volume reduction of the cylinder.

7. Apparatus for measuring leakage from a closed hollow body, comprising a closed system including said body having fluid under pressure trapped therein, a plunger movable interiorly of said system in a fluid tight cylinder and mounted in proximity to the said body for reducing the effective volume thereof to compensate for the volume of fluid leaking from the body and maintain said pressure, rotatable means for effecting said volume-reducing movement of said plunger, and means below the rotatable means for indicating the volume reduction of the system.

8. Apparatus for measuring leakage from a closed hollow body, comprising a closed system including said body having fluid under pressure trapped therein, a fluid-tight cylinder in direct communication with said system with an opening adjacent to the inlet of the closed hollow body, a plunger axially movable in said cylinder for reducing the effective volume thereof to compensate for fluid leakage from the body and maintain said trapped fluid pressure, means for applying pressure to said plunger in opposition to the trapped fluid pressure for effecting volume-reducing movement thereof, and means movable with the plunger for indicating the reduction in volume of the cylinder.

9. In apparatus for static pressure leak testing of closed hollow bodies by fluid under pressure trapped in a closed body, a device for measuring leakage comprising a bellows communicating with said body, means applying a predetermined substantially constant pressure to the bellows in opposition to the trapped fluid pressure for compression of the bellows to compensate for fluid leaking from the body and maintain said trapped fluid pressure, and means indicating the reductin in effective volume of the bellows.

10. A device for measuring leakage from a closed hollow body in leak testing thereof by fluid under pressure trapped therein, comprising a bellows in communication with said body, means applying a predetermined substantially constant pressure to said bellows in opposition to said trapped fluid pressure for reduction of effective volume of the bellows to compensate for the volume of fluid leaking from the body and maintain said trapped fluid pressure, and means indicating the reduction in volume of the bellows.

11. Apparatus for measuring leakage from a closed hollow body, comprising means for trapping fluid under pressure of predetermined value in said body, a bellows in communication with the body under said trapped fluid pressure, means applying to the bellows in opposition to the trapped fluid pressure substantially constant pressure of said predetermined value for reducing the effective volume of the bellows to compensate for the volume of fluid leaking from the body and maintain said predetermined value of the trapped fluid pressure, and means indicating the reduction in volume of the bellows.

12. Apparatus for measuring leakage from a closed hollow body comprising a closed pressure fluid system including said body, means for trapping fluid under pressure of a predetermined value in said system, movable means subjected to said trapped fluid pressure, means applying to said movable means in opposition to the trapped fluid pressure a substantially constant pressure of said value for moving the movable means to reduce the volume of said system in compensation for leakage from the body and to maintain the trapped fluid pressure at said value, and means indicating the reduction in volume of the system.

13. Apparatus for measuring leakage from a closed hollow body, comprising a supply of fluid under substantially constant pressure, shut-off means for trapping a portion of said fluid under said pressure in said body, bellows means in communication with the body under said trapped fluid pressure, means by-passing said shut-off means applying said constant supply pressure to said bellows means in opposition to the trapped fluid pressure for reducing the effective volume of the bellows means to compensate for leakage from the body and maintain the trapped fluid pressure at said pressure, and means indicating reduction in volume of the bellows means.

14. Apparatus for measuring leakage from a closed hollow body, comprising a supply of fluid under substantially constant pressure, shut-off means for trapping a portion of said fluid under said pressure in said body, means subjected to said trapped fluid pressure movable for reducing the effective volume of trapped fluid to compensate for leakage from the body and maintain the pressure thereof, means by-passing said shut-off means applying said constant supply pressure to said movable means in opposition to the trapped fluid pressure for effecting volume-reducing movement thereof, and means indicating reduction in volume of the trapped fluid.

References Cited in the file of this patent

UNITED STATES PATENTS

| | | |
|---|---|---|
| 1,650,736 | Zelov | Nov. 29, 1927 |
| 2,244,392 | Emanueli | Jan. 3, 1941 |
| 2,327,642 | Horner | Aug. 24, 1943 |
| 2,330,236 | Peters | Sept. 28, 1943 |
| 2,604,779 | Purcell | July 29, 1952 |
| 2,627,183 | Greenwood et al. | Feb. 3, 1953 |
| 2,737,804 | Herzog et al. | Mar. 13, 1956 |